Patented Sept. 21, 1943

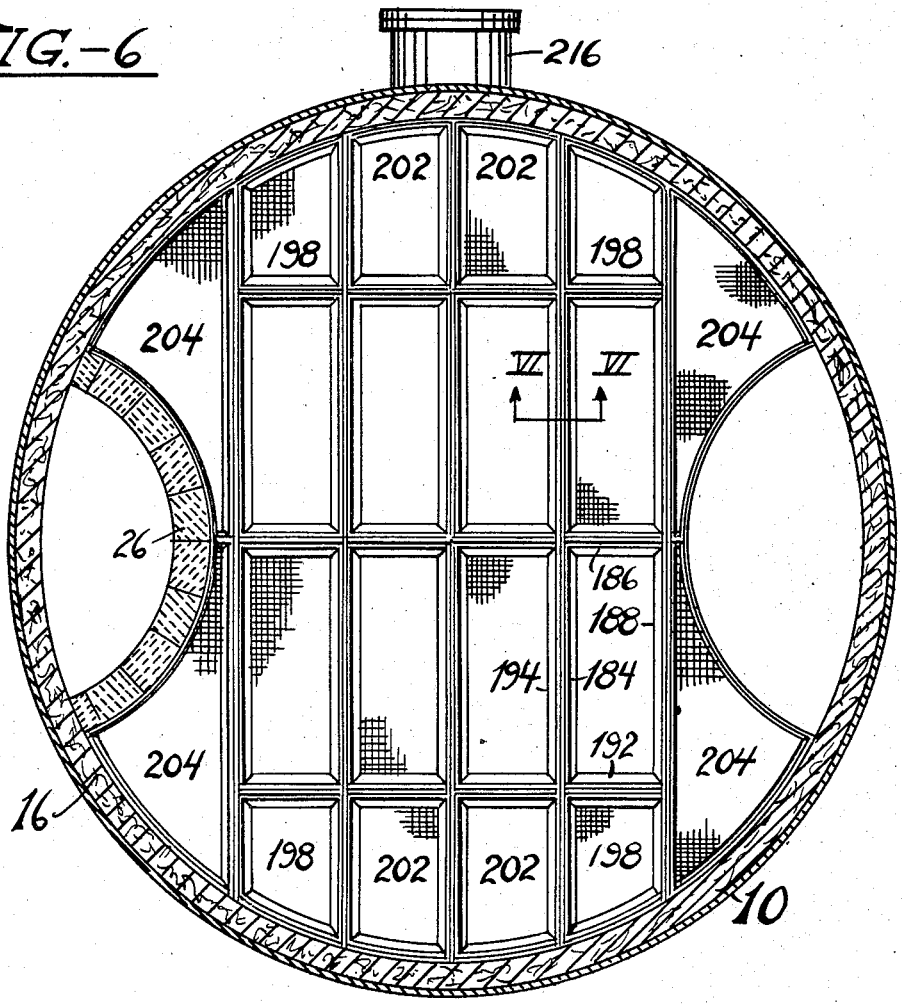

2,330,068

UNITED STATES PATENT OFFICE 2,330,068

CATALYTICALLY TREATING FLUIDS

Joseph V. Marancik, Roselle, and Lyle M. Cooper, Rahway, N. J., assignors to Standard Oil Development Company, a corporation of Delaware Application March 21, 1941, Serial No. 384,446

13 Claims. (Cl. 196—52)

This invention relates to catalytic treatment of fluid reactants and more particularly relates to catalytically treating hydrocarbon fluids.

According to our invention, a reaction chamber is provided having two spaced beds of catalyst particles. The upper bed of catalyst is supported on the lower bed by means of a system of floating girders or frames. The lower bed in turn is supported directly on the bottom head of the reaction chamber. This arrangement is required due to a progressive shrinkage throughout the life of the catalyst amounting to about 10% or more. This arrangement thus permits the upper bed to descend at the rate of shrinkage of the catalyst in the lower bed.

The reaction chamber is provided with an inlet and an outlet for fluids. Adjacent the inlet the reaction chamber is provided with a passageway for conducting part of the reactants below the bottom of the lower bed of catalyst particles and the rest of the reactants to the space above the top bed of catalyst particles. The reactants pass upwardly through the lower bed and downwardly through the upper bed of catalyst, the streams of reaction products being combined in the space between the catalyst beds and being conducted away and passed from the reaction tower through the outlet to any suitable apparatus for separating desired products.

In the prior art, reaction chambers are provided in which the catalyst beds are directly supported by the reaction chamber. In these prior art devices it is necessary to limit the pressure drop through the catalyst beds where the reactants pass upwardly through the bed. If the pressure drop is greater than the weight of the catalyst particles, it is necessary to provide means for holding the catalyst particles in place. In our construction it is possible to employ a high pressure drop across the catalyst beds because the pressure is always active against a firm support. In the upper bed the direction of flow is downward and there is no tendency to blow the catalyst particles off the bed. In the lower bed where the flow of reactants is upward, the catalyst particles are held down by the weight of the top bed.

The pressure drops across the beds of catalyst oppose each other and thus do not cause any additional load, due to pressure drop, to be placed on the supporting structure for the beds. In this way the pressure drop may be as high as desired and is limited only by the crushing strength of the catalyst particles. In our apparatus the arrangement compensates for any shrinkage of the catalyst as the top bed is supported by the lower bed of catalyst and the screen on the top of the lower bed will be held thereon under all conditions by the top bed.

The reaction chamber may be used in a multibed type including more than two beds by dividing the reaction chamber into units of two beds per unit. In such an arrangement the odd numbered beds would be individually supported by suitable means associated with the outer shell of the reactor and the even numbered beds would be supported by the respective beds directly beneath them. Our invention also contemplates a method of reacting fluids in the presence of beds of catalysts.

In the drawings:

Figure 5 represents a horizontal cross section taken near the top of the chamber substantially on line V—V of Figure 1; and Figure 6 represents a detail in section taken along line VI—VI of Figure 5 showing the means for holding the top screens in place on the top catalyst bed.

Figure 1:
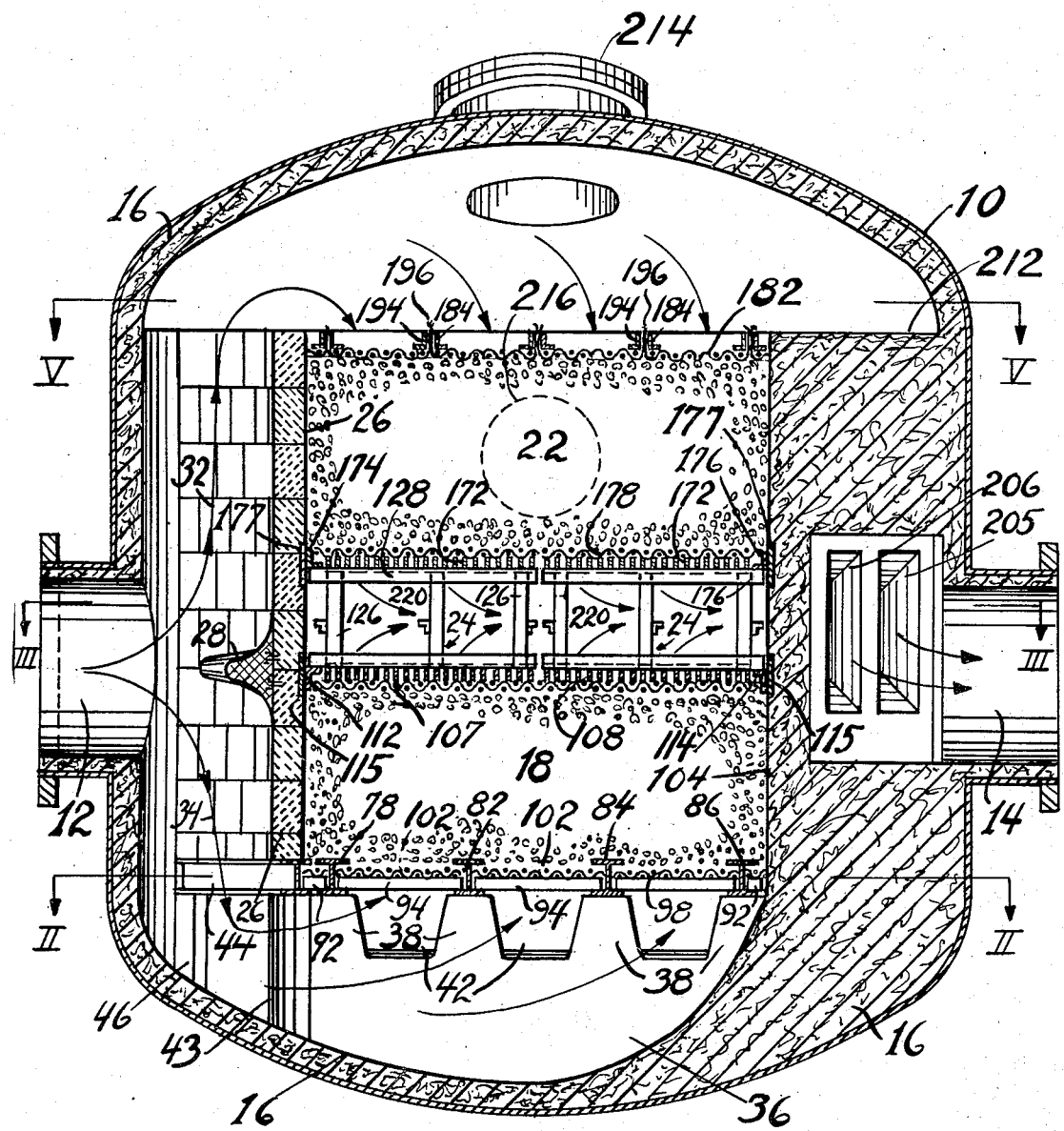
Figure 1 represents a vertical cross section taken through a reaction chamber or tower embodying our invention.

Referring now to the drawings, the reference character 10 designates a reaction chamber or tower having an inlet 12 and an outlet 14 on the opposite side of the reaction chamber. The reaction chamber is shown as provided with a layer of insulation 16. Any suitable insulation may be used and in some instances the insulation may be omitted.

Supported within the reaction chamber 10 are a bottom catalyst bed 18 and a top catalyst bed 22. The top bed is spaced from and supported by the bottom catalyst bed 18. The bottom catalyst bed is supported on the bottom head of the reaction chamber as will be hereinafter described in greater detail. The upper or top catalyst bed 22 is supported by the lower catalyst bed 18 by means of floating frames generally indicated as 24 and which will be more particularly described hereinafter.

Adjacent the inlet 12 an arch 26 is provided which is in the form of an arc and extends from the insulation 16 at one side of the inlet 12 to a point on the other side of the inlet 12. See Figure 3. The arch 26 provides a passageway for the reactants as they enter the reaction chamber 10 through inlet 12. The arch 26 is provided with a dividing means 28 in the form of a rounded projection adjacent the inlet 12 for dividing the stream of reactants into two portions, one portion passing upwardly as indicated by the arrows 32 to the space above the top catalyst bed 22 and the other portion passing downwardly as shown by the arrows 34 to the space beneath the bottom catalyst bed 18. The reactants pass downward through the top bed of catalyst 22 and upward through the bottom catalyst bed 18.

The supporting means for the bottom catalyst bed and the arch 26 will now be described in greater detail. See Figures 1 and 2. Supported on the bottom of the reaction chamber is a relatively narrow central supporting wall 36 which is provided with spaced piers 38 and cut away portions 42 between the piers 38. The front portion of the supporting wall 36 as indicated at 43 is spaced from the side wall of the reaction chamber. Two H-beams 44 are provided for supporting the arch 26, one end of each of these beams 44 resting on the front end of the supporting wall 36. The other end of the one beam 44 rests on the pier 46 which is supported by the insulation 16 and chamber 10. A similar pier 47 is provided for the other end of the other beam 44. These H-beams 44 provide the support for the arch 26.

Figure 2:
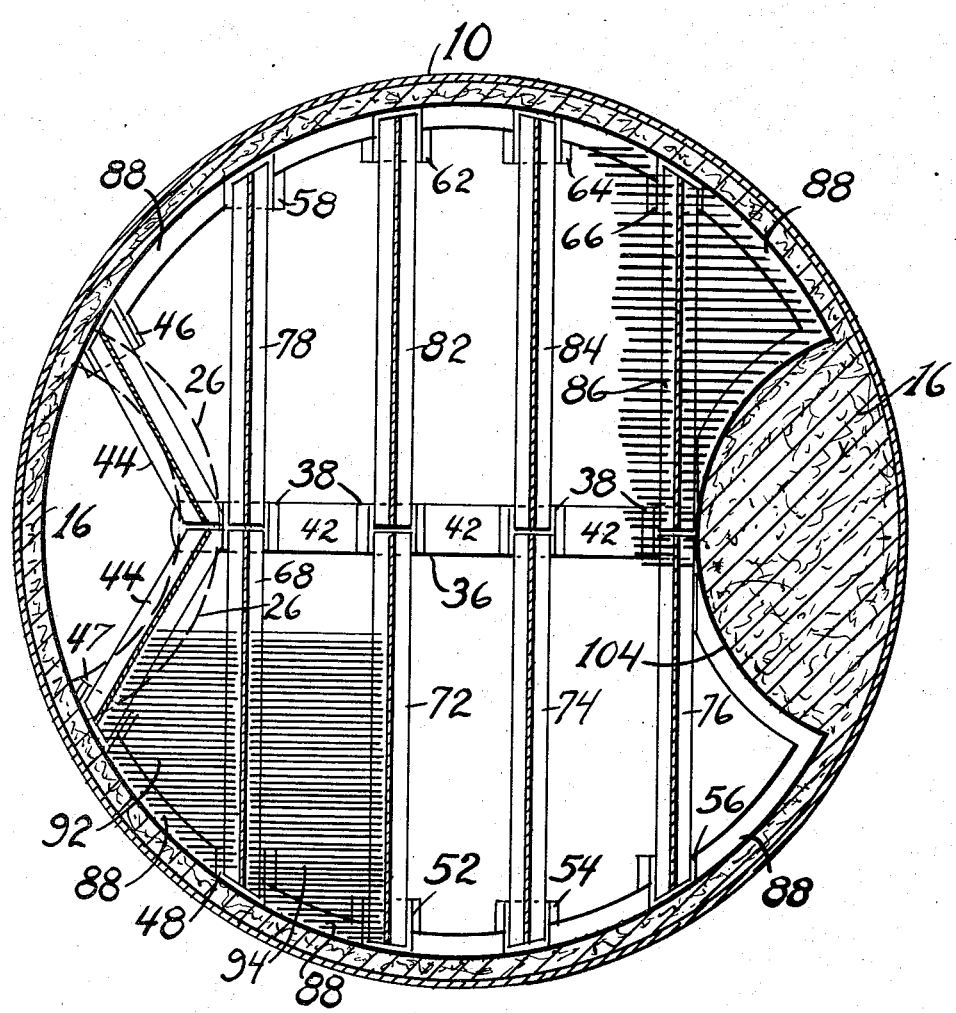
Figure 2 represents a horizontal cross section taken near the bottom of the chamber substantially along line II—II of Figure 1 and showing the supporting means for the bottom bed of catalyst particles.

The reaction chamber is substantially circular in horizontal cross section and additional pillars are arranged in the interior of the reaction chamber for supporting the ends of additional H-beams which are used for supporting the bottom catalyst bed 18. As shown in Figure 2, piers 48, 52, 54 and 56 are provided on one side of the reaction chamber and corresponding piers 58, 62, 64 and 66 are arranged on the opposite side of the reaction chamber.

H-beam 68 extends from the center wall 36 to the pier 48. H-beams 72, 74 and 76 have their one end supported on the central supporting wall 36 and their other ends supported, respectively, on piers 52, 54 and 56. H-beams 78, 82, 84 and 86 are arranged on the other side of the central supporting wall 36 and have one end supported on the central supporting wall and their other ends supported, respectively, on piers 58, 62, 64 and 66. When the several H-beams are in position, they are lined up in pairs as shown in Figure 2.

In addition to the several piers above described, a ledge 88 is provided in the interior of the reaction chamber to support sections of grating later to be described for supporting the catalyst particles in place in the lower catalyst bed 18.

Supported on the flanges of the H-beams and on ledge 88 are a plurality of grating sections. Preferably the grating sections are made as units. See Figures 1 and 2. The grating section 92 is substantially triangular in outline and is made of strips of metal held together in any suitable manner as a unit. The section 92 has one side supported on the lower flange of the short H-beam 44 which supports the arch 26 and has another side supported by the lower flange of the H-beam 68. The third side of grating 92 is supported by ledge 88. Another grating section 94 is provided between the H-beams 68 and 72 and has its sides resting on the bottom flange of the H-beams. The outer end of section 94 rests on ledge 88.

Another grating section is provided between the H-beams 72 and 74 and has its side portions resting on the bottom flanges of the H-beams. Another grating section has its side portions resting on the bottom flanges of H-beams 74 and 76. These grating sections are similar in shape to section 92 and are not shown in the drawings to facilitate the showing.

At the other end of this half of the reaction chamber an irregular shaped grating section is provided having one side portion resting on the bottom flange of the H-beam 76 and the other two sides of the section resting on the ledge 88. The other half of the reaction chamber is of the same construction for supporting the other half of the bottom catalyst bed and similar grating sections or units are used.

Resting on the grating sections and extending between the vertical members of the H-beams used for supporting the bottom bed of catalyst are sections 98 of wire of a relatively coarse mesh for preventing the catalyst particles from falling through the grating sections. Preferably, the catalyst particles are of a sufficiently large size to prevent falling through relatively large wire mesh. For example, pills or granules of catalyst may be used. Any suitable catalytic material may be used, as, for example, in the catalytic conversion of higher boiling hydrocarbons to lower boiling hydrocarbons natural or activated clays may be used. Synthetic gels containing silica and alumina or silica and magnesia may be used. For other reactions, any of the desired catalysts may be used in granular form.

Supported by the grating sections and the wire mesh are the catalyst granules or pills 102 which form the bottom catalyst bed 18. The catalyst bed is confined between the lower portion of the arch 26 and the rear wall 104. The rear wall 104 is curved at the side adjacent the outlet 14 as will be hereinafter described in greater detail.

Resting on top of the bottom catalyst bed 18 is wire mesh 107 over which is placed grating 108 which may be in one section but which is preferably formed of a plurality of sections. As shown in the drawings, the grating 108 has its webs or strips arranged at right angles to those in the bottom grating sections hereinbefore described. Curved angle sections 112 and 114 are arranged adjacent the curved arch 26 and the curved rear wall 104, the curved angle sections being arranged at the upper edge portions of the bottom catalyst bed. The angle pieces act as trim angles to prevent edges of girders and wires from gouging out the arch and rear wall. Wearing strips 115 are provided in the arch and rear wall 104 adjacent angle trims 112 and 114 to reduce wear on the arch and rear wall. The angle pieces and wear plates reduce wear of the internal wall of the reactor due to expansion or other movement of girders and associated parts.

Figure 4:
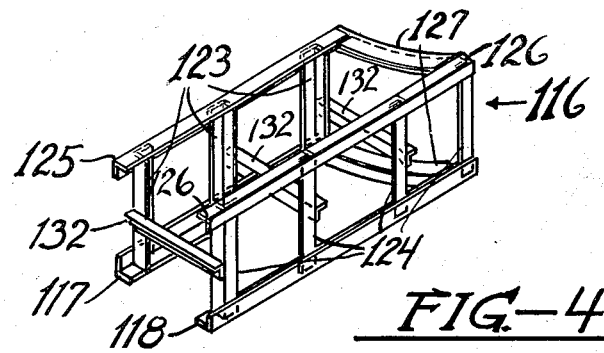
Figure 4 represents a perspective view of one of the supporting frames.
Figure 3:
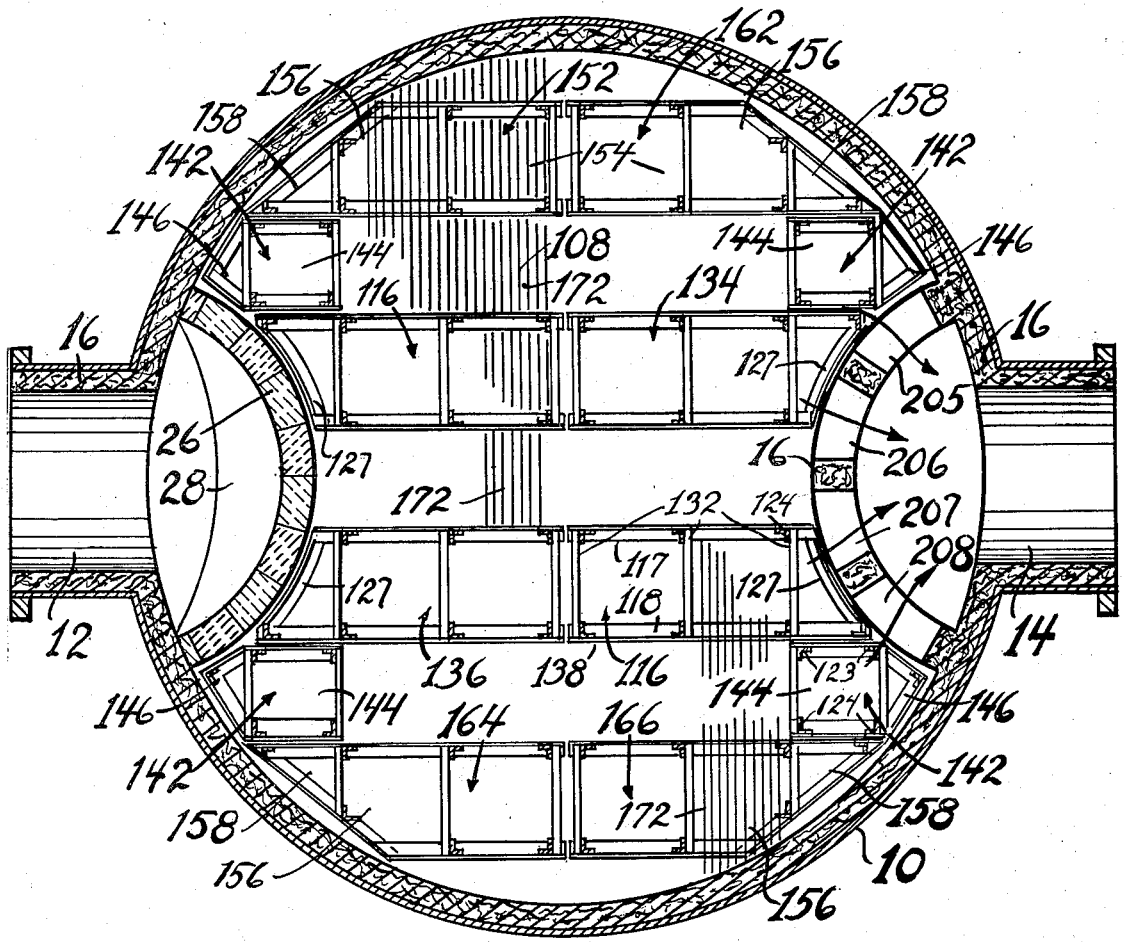
Figure 3 represents a horizontal cross section taken along line III—III of Figure 1 and showing the supporting frames for the top bed of catalyst.

Arranged on the top grating 108 are a plurality of supporting or truss frames in the form of box girders. These frames are preferably made in separate units as will be now described and are provided for supporting the upper or top catalyst bed 22. The supporting frames provide an open or skeleton network so as to permit products of reaction to freely pass in the space between the two catalyst beds. Attention is directed to Figures 1, 3 and 4 and more particularly to Figure 4 which shows one of the box girders in perspective and which is generally designated 116. In the box girder 116 the reference character 117 designates a horizontally extending angle member which forms part of the base and which rests on the grating 108. The girder also includes a second elongated angle member 118 which forms part of the base and is spaced from and parallel to angle member 117.

The angle member 118 is somewhat longer than the angle member 117 and also rests on the grating 108. Secured to and extending vertically from the flange on the horizontal member 117 are three spaced vertical angle members 123. Extending upwardly from the other horizontal angle member 118 are four spaced angle members 124. Spaced from and arranged above and in parallel relation to the lower angle member 117 is an upper angle member 125 as shown in Figure 4 which rests on the tops of the upright members 123. Another angle member 126 similar to the larger piece 124 is arranged on the tops of vertical angle members 124. Curved end angles 127 are used to connect the ends of the elongated angle members 117, 118, 125 and 126.

In order to strengthen the construction, the vertically arranged angle members 123 and 124 are connected by separate horizontally extending angle members 132 as shown in Figure 4. The angle members are secured together by riveting, soldering, welding or any suitable way to form a rigid construction.

The description above given applies to frame or girder 116 and the description will not be repeated for the other frames. From the drawings, it will be seen that frames 134, 136 and 138 are of substantially the same construction as the frame 116 described above. Another box or girder frame is arranged adjacent the inner wall and the arch 26 and is indicated by the reference numeral 142. This frame comprises a rectangular section 144 and a substantially triangular section 146. Three other similar sections designated by the same reference character 142 are shown in Figure 3, one being adjacent the other end or side of the arch and the other two being arranged adjacent the rear wall 104.

Another box or girder frame is indicated by the reference numeral 152 and includes a rectangular section 154, a pentagonal member 156 and a triangular portion 158, triangular portion 158 being adjacent the box frame 142 above described. Another girder frame 162 is of substantially the same construction as frame 152 and the frames are substantially in alignment as shown in Figure 3. On the other side of the center in Figure 3 two other frames 164 and 166 are provided which are of substantially the same construction as the box frame 152.

From the above description and from an inspection of the drawings, it will be seen that the box or girder frames do not completely fill the space between the catalyst beds but only are used in such number as to give sufficient support for the top catalyst bed. For example, it will be seen that there is a relatively large space between alined box frames 136, 138 on one hand and alined box frames 164 and 166 on the other. Also there is a space between box frames 164, 166 and the internal wall or insulation 16 of the reaction chamber. The other half of the reaction chamber is substantially the same and similar spaces are provided for free passage of the reaction gases.

Supported on the box or girder frames above described is grating 172 which may be in one section but is preferably in a plurality of sections. The webs of the grating are substantially parallel to those in the grating 108 resting on top of the bottom catalyst bed 18.

Curved angular members 174 and 176 are arranged at the bottom edge portions of the catalyst bed 22 and extend respectively around the arch 26 and the rear curved portion of the wall 104. These curved members 174 and 176 are similar to the members 112 and 114 previously described. Wear plates 177 are provided adjacent angle members 174 and 176 for the same reasons above given in connection with wear plates 115.

Arranged on top of the grating 172 is a screen or wire mesh 178 which is of a sufficiently fine mesh to prevent the catalyst particles from dropping through the screen. The upper bed 22 is made up of granules or particles of catalyst in pill form or the like so as to be of a relatively large particle size so that the reactants may pass through the mass readily and the catalyst particles will be held on the screen as a bed.

Arranged on the top of the top bed 22 is another screen or wire mesh 182 to prevent piling up of catalyst particles on one side of the reactor and to maintain the depth of the bed substantially uniform throughout the area of the bed. The screen is preferably in sections and the sections are held in place by angle members. The angle members are so arranged as shown in Figure 5 as to form rectangular and similar shapes. One of the sections will be described. The angle members 184, 186, 188 and 192 have their ends cut off at complementary angles to form a rectangle. The remaining sections are similarly constructed. In order to hold the wire sections in place, the ends of the pieces of wire are extended between the vertical flanges of the angle members 184 and 194, for example, as shown in Figure 6 and a tie wire 196 is passed through openings in the vertical flanges of the angle members 184 and 194. The sections such as 198, 202 and 204 adjacent the inner wall 16, arch 26 and rear curved wall 104 are not rectangular in shape but are shaped to conform to the outline of the reactor. The sections of wire mesh are held in place by tie wires and the flanges as above described in the rectangular section.

A plurality of passages are provided for conducting the products of reaction from the space between the catalyst beds to the outlet 14. These passages are indicated as 205, 206, 207 and 208 in the drawings. See Figures 1 and 3. By having the four passages as shown, there is a better removal of the products of reaction and a better distribution of the reactant gases in the catalyst beds. As shown in Figure 3, the passages 205, 206, 207 and 208 are arranged on the arc of a circle and the arc is of substantially the same dimensions as the arch 26 to give a larger effective outlet for the reaction products. While the outlet passages as shown in Figure 1 extend for only a portion of the distance from the bottom of the lower catalyst bed to the top of the upper catalyst bed, it is preferred to extend the rear wall 104 for this entire distance so that the catalyst beds 18 and 22 will be of substantially the same volumetric size. For this reason there is more insulation in the reaction chamber above the passages 205, 206, 207 and 208 and below these passages than there is in the other parts of the reaction chamber.

An enlarged opening 214 is provided in the top portion of the reaction chamber at one side of the center. Another enlarged opening 216 is provided at the side adjacent the top catalyst bed 22. These openings 214 and 216 provide means for filling the reaction chamber with catalyst and for inspecting the interior of the reaction chamber.

The reaction chamber made according to our invention is adapted for carrying out reactions catalytically and more particularly relates to the catalytic conversion of hydrocarbon fluids. When the device is used for cracking hydrocarbon oils to make lower boiling hydrocarbons within the gasoline boiling range, the catalyst particles become coated and contaminated with a carbonaceous deposit which lessens the activity of the catalyst particles and finally makes the catalytic reaction unprofitable.

After the catalyst particles become contaminated with carbonaceous deposits, they are preferably regenerated by burning the carbonaceous deposits with air or mixture of air and steam or other similar gases. Before regenerating, however, the catalyst particles are purged with steam in order to remove volatile oils. After the regeneration, the catalyst beds are likewise purged with steam or other inert gas to remove any traces of oxygen in the catalyst beds before starting another cracking operation. In regenerating, the oxidizing gas is passed through inlet 12, split into two streams, one stream passing down through the upper bed of catalyst and the other stream passing up through the lower catalyst bed. The streams are then united in the space between the catalyst beds and leave the reactor through outlet 14.

While we have shown only two beds in the drawings, it is to be understood that this is our preferred construction but the reaction tower may be made in larger sizes and a plurality of units of two beds of catalyst may be supported therein. In each unit one catalyst bed is supported by the reaction chamber and the catalyst bed directly above it is supported only by the catalyst bed beneath it.

In carrying out a reaction it will be seen that the reactants are divided into two portions, one portion passing upward to the space above the top catalyst bed 22 and the other portion being directed below the bottom catalyst bed 18. The top stream flows downwardly through the upper catalyst bed and into the space between the two catalyst beds and the bottom stream passes upwardly through the bottom catalyst bed into the space 220 between the catalyst beds. The products of reaction are combined and pass from the opposite side of the reaction chamber to outlet 14. According to our construction, any desirable superatmospheric pressures may be used without danger of blowing off the top layer of catalyst particles in either bed. In the top catalyst bed 22 there is no danger of blowing off the catalyst particles because the movement of the gas or reactants is downward. The top screens 202, 204, etc. are placed on top of bed 22 so as to insure a uniform depth of bed and prevent the top layer of catalyst from being disturbed by vapor currents. Likewise, there is no loss by blowing off of the top layer from the bottom catalyst bed because the catalyst particles are held in place by the grating and the force exerted by the weight of the top catalyst bed.

When superatmospheric pressures are used, it will be noted that the pressure drops through the top catalyst bed and lower catalyst bed cancel each other out and because of the opposing pressures, there is less need for supporting as much weight on the supporting means for the bottom catalyst bed 18.

It has been above pointed out that the invention may be used with more than two beds and that the odd numbered beds would be individually supported by the outer shell. However, our invention may further be used with more than two beds with only the bottom bed supported by the outer shell and the rest of the beds all supported one above the other by the bottom bed. In this way an odd or even number of beds may be used.

While our apparatus is especially adapted for use in catalytic cracking of hydrocarbons generally, it also may be used for catalytic reforming or hydroforming, catalytic dehydrogenation, catalytic polymerization, alkylation, bauxite treating, etc., and in similar reactions utilizing fixed beds of catalyst.

While we have shown one form of apparatus and have described certain processes for catalytically treating fluids, it is to be understood that these are by way of example only and various changes and modifications may be made without departing from the spirit of our invention.

We claim:

1. An apparatus of the character described including a reaction chamber, a bottom bed of catalyst particles, means for supporting said bottom bed of catalyst particles in said reaction chamber, an upper bed of catalyst particles spaced from said bottom bed of catalyst particles, means for supporting the said upper catalyst bed of particles directly on the lower bed of catalyst particles and an outlet for reactants between said upper and lower beds.

2. A reaction chamber provided with an inlet and an outlet, spaced catalyst beds within said chamber, means for supporting said lower catalyst bed directly on said reaction chamber, skeleton frame means resting on the top of said bottom bed of catalyst for supporting said upper bed of catalyst and for maintaining it in spaced relation to said bottom bed of catalyst to compensate for shrinkage of catalyst and passageways in said skeleton frame means communicating with said outlet for permitting withdrawal of products of reaction from said reaction chamber.

3. A reaction chamber as defined in claim 2 in which said reaction chamber is provided with a vertically extending passageway adjacent said inlet for conducting a portion of the reactants downward below the bottom catalyst bed and another portion upward to the top of the upper catalyst bed whereby the reactants flow toward each other and toward said first mentioned passageway between said catalyst beds.

4. A reaction chamber according to claim 2 in which said reaction chamber is provided with a plurality of openings associated with said outlet and arranged on the arc of a circle and communicating with the passageway between said catalyst beds to effect more uniform distribution of the reactants with respect to said catalyst beds by withdrawing products of reaction over a larger area.

5. A reaction chamber according to claim 2 in which means are provided adjacent said inlet for conducting part of the reactant fluids below the bottom catalyst bed and the rest of the reactant fluids above the top catalyst bed whereby the reacant fluids pass through said catalyst beds in opposite directions toward the passageway between said catalyst beds.

6. In an apparatus of the character described including a reaction chamber, a bed of solid contact particles, means for supporting said bed in said reaction chamber and another bed of solid contact particles spaced from and above said first mentioned bed, said upper bed being supported by said first mentioned bed, means for supplying reactants to the top of the upper bed and to the bottom of the lower bed of catalyst particles and an outlet for reactants between said beds.

7. A reaction chamber as defined in claim 2 in which said reaction chamber is provided with an inlet for conducting reactants below the bottom catalyst bed and for conducting reactants above the top of the upper catalyst bed whereby the reactants flow toward each other through said catalyst beds and a wire screen is arranged on the top surface of said lower catalyst bed to hold the catalyst particles down, said wire screen being held in place by said top catalyst bed and any shrinkage of the lower catalyst bed is compensated for by maintaining said wire screen on top of the surface of said lower catalyst bed.

8. An apparatus of the character described including a reaction chamber, a lower bed of catalyst particles, means for supporting said lower bed of catalyst in said reaction chamber, an upper bed of catalyst particles spaced from said bottom bed of catalyst particles and supported by said lower bed of catalyst particles, a screen on the top surface of said lower bed of catalyst particles, said screen following the top surface of said lower bed of catalyst particles when said surface moves due to shrinkage.

9. An apparatus of the character described including a reaction chamber, a plurality of catalyst beds in said reaction chamber, means for supporting at least one of said catalyst beds on the internal wall of said reaction chamber and girder means resting on the top of said supported bed for supporting another catalyst bed directly above it and for maintaining the last mentioned catalyst bed in spaced relation to said supported bed and an outlet passageway communicating with the space provided by said girder means whereby reactant fluids pass upwardly through said fixed and supported bed and downwardly through said girder means supported bed.

10. A method of reacting fluids in the presence of catalysts which comprises passing one stream of reactants upward through a bed of catalyst supported in a reaction chamber and passing another stream of reactants downward through another catalyst bed spaced from and resting on the first mentioned bed of catalyst, combining the two streams of reactants in the space between the beds and withdrawing the combined reactants from the reaction chamber.

11. A method of converting hydrocarbon fluids wherein hydrocarbon fluids heated to a conversion temperature and under elevated pressure are passed through a plurality of spaced stationary catalyst beds in a reaction chamber, the upper catalyst bed being spaced from and supported by the lower catalyst bed, the steps which comprise passing the heated hydrocarbon fluids upwardly through said lower catalyst bed and downwardly through said upper catalyst bed, combining the converted hydrocarbons in the space between said beds and withdrawing the mixture from said reaction chamber.

12. A method of reacting fluids in the presence of catalysts which comprises passing one stream of reactants under superatmospheric pressure upward through a lower bed of catalyst in a reactor and passing another stream of reactants under superatmospheric pressure downward through an upper bed of catalyst supported by said lower bed of catalyst, the flow of reactants being in opposite directions so that the forces due to pressure drop are equal and opposite in direction and cancel each other, thereby reducing the load to be carried by said reactor.

13. A method as defined in claim 12 wherein the pressure on the reactants may be increased up to the crushing strength of the catalyst particles without blowing catalyst particles off the lower catalyst bed.

JOSEPH V. MARANCIK.
LYLE M. COOPER.